United States Patent [19]

Roe

[11] 4,305,206

[45] Dec. 15, 1981

[54] ONE PIECE LOOP HINGE

[75] Inventor: Alfred W. Roe, Bellport, N.Y.

[73] Assignee: Roe International Inc., Patchogue, N.Y.

[21] Appl. No.: 115,256

[22] Filed: Jan. 25, 1980

[51] Int. Cl.³ .............................................. G01B 3/10
[52] U.S. Cl. .............................................. 33/137 R
[58] Field of Search ................ 242/84.8; 33/137, 138, 33/139, 140; 24/255 SL, 129 R, 129 D, 265 A, 265 EC, 265 H, 265 AL

[56] References Cited

U.S. PATENT DOCUMENTS

| 2,809,142 | 10/1957 | Beeber et al. | 33/137 R |
| 3,744,104 | 7/1973 | Ford | 24/248 SL |
| 4,142,294 | 3/1979 | Adair | 24/255 SL X |

Primary Examiner—Harry N. Haroian
Attorney, Agent, or Firm—Harold L. Stults; Pasquale A. Razzano

[57] ABSTRACT

A loop for a tape measure consists of a one piece element having a loop portion and an integral tape connecting portion. The tape connecting portion has at least one pair of flexibly connected flaps which serve to secure the loop to the free end of a measuring tape. An integral "living" hinge connects the flap portions and the loop portion.

13 Claims, 9 Drawing Figures

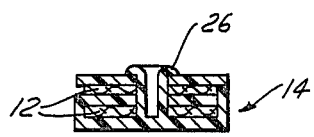
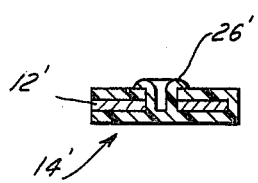
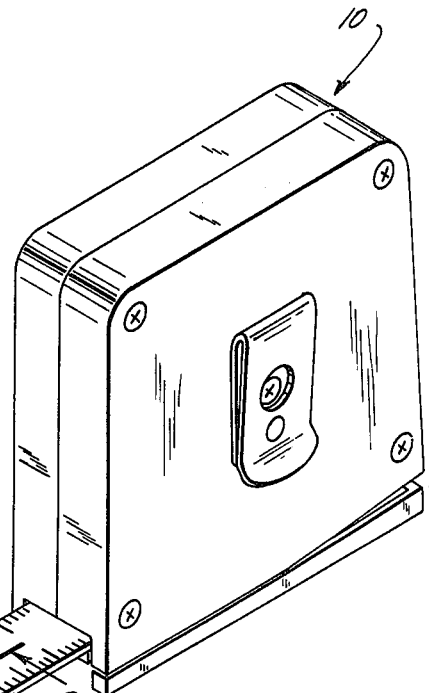
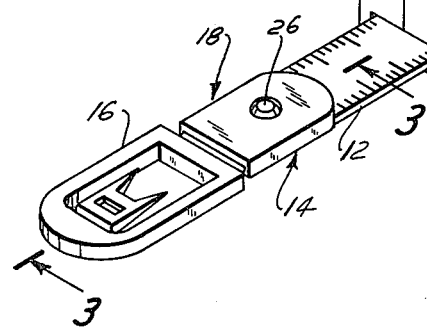
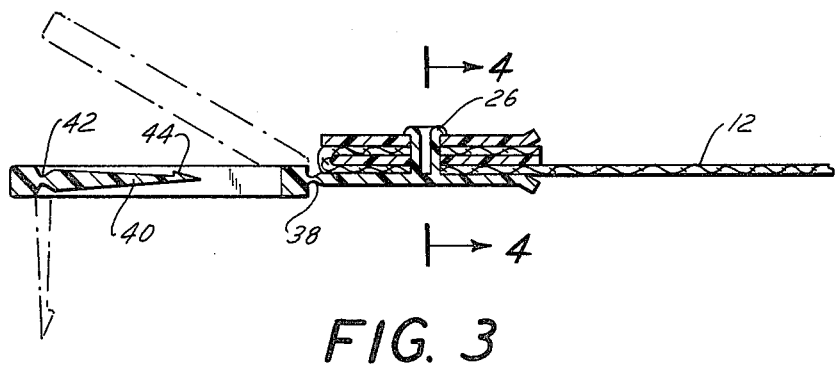

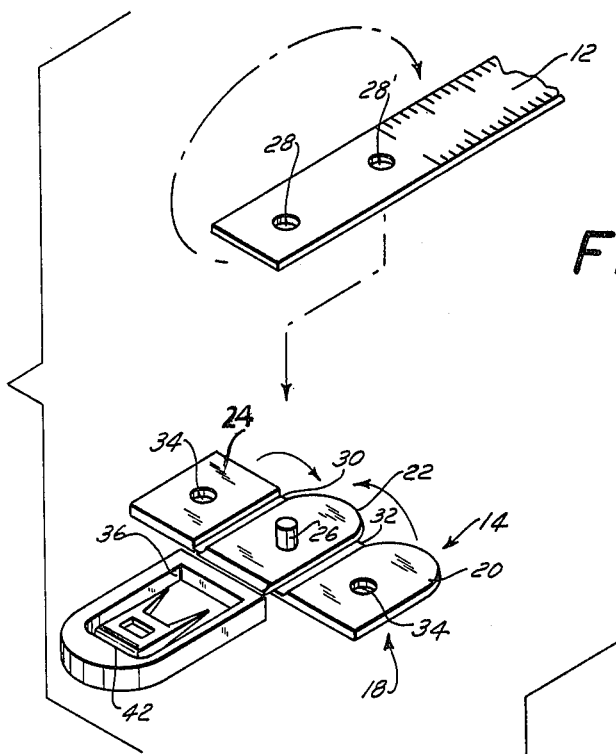
FIG. 2
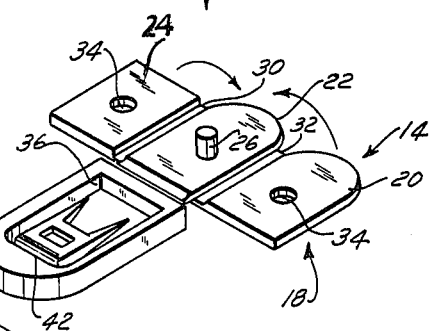
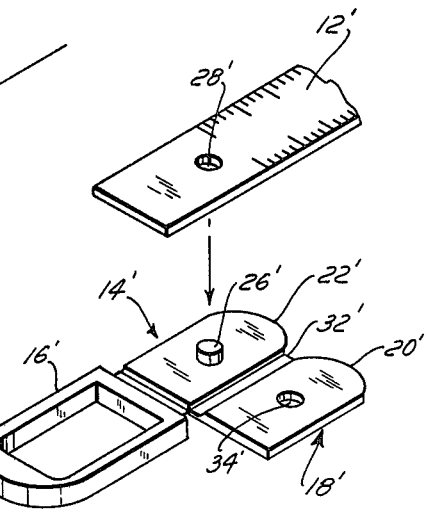
FIG. 5
FIG. 8
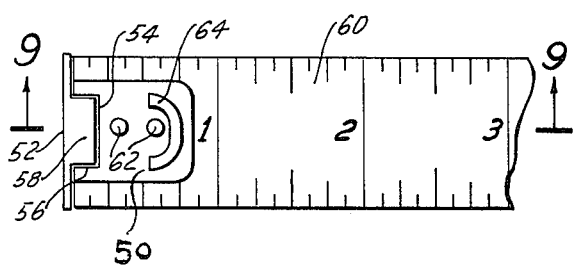
FIG. 9
FIG. 6
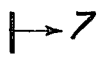

ONE PIECE LOOP HINGE

The present invention relates to tape measures, and in particular to a loop for use on an extensible tape measure.

Conventional extensible tape measures have a loop or pull tab mounted at the free end of the tape to extend beyond the end of the tape casing. This loop or tab generally is formed as a metal element connected to the tape end through a separate hinge which is eyeletted to the tape end. This arrangement is relatively expensive to manufacture, due to the cost of the materials and the assembly time in putting the multiple elements together.

It is an object of the present invention to provide an improved loop for the end of a tape measure.

Another object of the present invention is to provide a loop for the end of a tape measure which is relatively inexpensive to manufacture and is durable in use.

A further object of the present invention is to provide a one piece tape end loop arrangement.

In accordance with an aspect of the present invention a tape measure loop is provided which consists of a one-piece plastic element having an apertured loop portion, a tape connecting portion, and an integral so-called "living" hinge flexibly connecting the loop to the tape connecting portion.

The connecting portion of the loop includes two or more flexibly connected flap members which serve to sandwich the free end of the tape and connect the loop to the tape. One of the flap elements includes a penetrating stud which is received in an aperture in the tape end to secure the loop to the tape end, and the other flap or flaps have corresponding apertures to receive the stud over the tape end, thereby to secure the loop to the tape. The apertured loop portion of the loop is adapted to pivot through the "living" hinge with respect to the remainder of the loop and the tape into any position desired. In one embodiment, the apertured loop includes a separate staking element integral with the loop and connected thereto through an integral "living" hinge, so that the loop end can be held in a fixed position by the stake.

The above, and other objects, features and advantages of this invention will be apparent in the following detailed description of an illustrative embodiment thereof, which is to be read in connection with the accompanying drawings, wherein:

FIG. 1 is a perspective view of a tape measure including a loop constructed in accordance with the present invention;

FIG. 2 is an exploded perspective view of the loop and tape end shown in FIG. 1;

FIG. 3 is a longitudinal sectional view taken along line 3—3 of FIG. 1;

FIG. 4 is a sectional view taken along line 4—4 of FIG. 3;

FIG. 5 is an exploded perspective view of another embodiment of the present invention adapted for use with metal tape rules;

FIG. 6 is a longitudinal sectional view similar to FIG. 3, of the embodiment of FIG. 5;

FIG. 7 is a sectional view taken along line 7—7 of FIG. 6;

FIG. 8 is a plan view of yet another embodiment of the present invention; and

FIG. 9 is a sectional view taken along line 9—9 of FIG. 8.

Referring now to the drawings in detail, and initially to FIG. 1 thereof, a conventional tape measure 10 includes a coiled tape rule 12 which is normally biased into its coiled or retracted position by an internal spring, in the conventional manner (not shown). The free end of tape 12 has a tape loop 14 mounted thereon constructed in accordance with the present invention. That tape loop is a one piece element which includes an apertured loop portion 16 and a connecting portion 18. In the illustrative embodiment of the invention tape 12 is formed of a flexible fiberglass based material, while loop 14 is formed of a plastic material. Preferably the plastic is clear so that the markings on the tape end are visible.

As seen in FIG. 2 tape loop 14 includes a plurality of flap elements 20, 22, 24 in connecting portion 18 thereof. The central flap element 22 has a width dimension which is substantially equal to the width dimension of the tape 12, and includes an upstanding stud 26 integrally formed therewith. This stud is adapted to be received in apertures 28 formed in the tape end, as described hereinafter.

Flaps 20, 24 are connected on opposite sides of main flap 22 through integral "living" hinges 30, 32 respectively. These living hinges are formed in a conventional manner integrally with flaps 20, 22, 24 as sections of smaller cross-sections than the adjacent flaps, so that the flaps can pivot with respect to each other about the hinges. Each of the secondary flaps 20, 24 also has a width dimension which approximately equal to that of tape ends 12 as well as apertures 34 formed therein which are adapted to receive the end of stud 26.

Loop portion 16 is integrally formed with connecting portion 18. Loop portion 16 is apertured, in that it has a central opening 36 through which the operator's finger can be inserted to aid in grasping the loop and pulling the tape end from casing 10. Loop portion 16 is connected to one edge of flap 22 through a "living" hinge 38. Again this "living" hinge is integrally formed with loop portion 16 and flap 22 and is a smaller cross-sectioned portion of the loop, so as to provide a flexible connection. "Living" hinges of this type are known in the plastic arts, but have not heretofore been used in forming tape measure loops.

In assembling loop 14 on the end of tape 12, stud 26 is first positioned in the rearmost of apertures 28 (labeled 28' in FIG. 2) and then flap 24 is folded over the tape so that aperture 34 receives stud 26. The extreme free end of the tape is then folded back over flap 24, as seen in FIG. 3, so that the outer aperture 28 receives stud 26. After the tape is positioned in this manner third flap 20 is pivoted over flap 24 until its aperture 34 receives stud 26. The stud is then expanded and heat sealed to the outer surface of the flap, in any convenient manner, as seen in FIG. 3, to form a permanent connection with the tape. With this arrangement loop portion 16 is free to pivot on hinge 38, as seen in phantom lines in FIG. 3. Although stud 26 is shown as being integral with flap 22 it is contemplated that the stud may be a separate element such as a metal eyelet or rivet.

In this embodiment of the invention loop portion 36 also includes a stake element 40, integrally formed with the loop. The stake is connected to the loop through an integral flexible hinge 42, so that the stake can pivot to a position perpendicular to the loop. The stake has an arrowhead portion 44 formed thereon, which enables the stake to be inserted in the ground or in some other object, to hold the tape end while the rule is used to measure a linear distance.

Another embodiment of the invention is illustrated in FIGS. 5-7. This embodiment is particularly adapted for use with a steel rule 12'. In this case loop 14' includes a loop portion 16' and a connector portion 18', similar to those previously described. However, only two flap elements 20', 22' are utilized, connected with the "living" hinge 32'. The top end 12' has single aperture 28' formed therein that is received on the stud 26' of flap 22'. After the tape is assembled to flap 22' in this manner flap 20' is folded over flap 22' and stud 26 is expanded and heat sealed, as described above, to form a permanent connection. As the steel rule 12' has a greater tensile strength than the fiberglass rule 12, the end of the tape needs less reinforcement and thus a connector 18' with only two flaps is needed. On the other hand, with the fiberglass tape 12 of the embodiment at FIG. 2, additional reinforcement is necessary and this is provided by the additional flap in the embodiment as described above.

Connecting portion 18' is connected to the loop 16' through an integral living hinge 38' in a manner similar to that of the previously described embodiment.

In some situations the flap 20' may be eliminated and the connection to the tape end made only with flap 22' and stud 26'.

A further embodiment of the invention is illustrated in FIG. 8 of the drawing. In this case the one piece loop hinge is formed with a single flap element 50 and a loop member 52 connected to the flap along an integral "living" hinge 54. The flap 50 is recessed as at 56, and a tongue 58 of the loop extends into the recess to the hinge 54. The flap itself is connected to the end of the tape 60 by a pair of rivets 62 or the like.

By this arrangement the loop 52 may be pivoted down out of the way, as illustrated in dotted lines in FIG. 9, so that the end of the tape, i.e. the zero point on the tape, can be placed against the end of the object being measured. This enables an inside measurement to be taken on a particular object, for example, on the interior of a window casing or the like.

As an additional feature of the invention, the flap member 50 in this embodiment, or the flap members 20' or 20 of the prior embodiments may be provided with an upstanding bumper element 64 formed thereon. This bumper will engage the upper edge of the opening in the tape measure casing, through which the tape extends, upon retraction of the tape. The bumper will absorb the shock of the retraction, and protect the loop against damage and disassembly from the tape end. The bumper is particularly advantageous in this location as it is formed of the same resilient plastic material as the loop.

Although an illustrative embodiment of the invention has been described herein with reference to the accompanying drawings, it is to be understood that the invention is not limited to that precise embodiment and that various changes and modifications may be effected therein by one skilled in the art without departing from the scope or spirit of this invention.

What is claimed is:

1. A tape measure loop comprising a one piece element having a loop portion and an integral tape connecting portion, said tape connecting portion including at least a pair of flexibly connected flaps, one of said flaps having means for securing it to the free end of a measuring tape with the other flap overlying said one flap over said tape end, and an integral living hinge connected between said loop portion and one of said flaps for pivotally connecting said loop to said tape.

2. A tape measure loop as defined in claim 1 wherein said tape connecting portion includes a third flap flexibly connected to said one flap on the side thereof opposite said other flap.

3. A tape measure loop as defined in claim 2 including integral living hinge means for flexibly connecting said other flap and said third flap to said one flap.

4. A tape measure loop as defined in claim 3 wherein said means for securing said one flap to the tape comprises an integral rivet on said one flap for penetrating the tape end and said other flap and said third flap each having an aperture therein receiving the rivet.

5. A tape measure loop as defined in claim 1 wherein said loop portion includes a stake and an integral living hinge flexibly connecting said loop to said stake.

6. A tape measure loop as defined in claim 5 wherein said one piece element is formed of plastic.

7. A tape measure loop comprising a one piece plastic element having an apertured loop, a tape connecting portion and an integral living hinge flexibly connecting said loop to said tape connecting portion; said tape connecting portion comprising a first flap integrally formed with said living hinge; said first flap having a tape end penetrating stud formed thereon.

8. A tape measure loop as defined in claim 7 including a second flap, and a second living hinge flexibly connecting said second flap to said first flap for permitting said second flap to overly said first flap and a tape end connected to said stud.

9. A tape measure loop as defined in claim 8 wherein said tape connecting portion includes a third flap and a third integral living hinge flexibly connecting said third flap to said first flap on the side thereof opposite said second flap for permitting said third flap to overly said first flap and a tape end connected to said stud.

10. A tape measure loop as defined in claim 9 wherein said second and third flaps have apertures formed therein for receiving said stud when overlying said first flap.

11. A tape measure as defined in claim 7 wherein said plastic element is formed of clear plastic.

12. A tape measure as defined in claim 7 wherein said flap has an integral tape bumper formed thereon.

13. A tape measure loop comprising a one piece plastic element having an apertured loop, a tape connecting portion and an integral living hinge flexibly connecting said loop to said tape connecting portion; said tape connecting portion comprising a first flap integrally formed with said living hinge; said apertured loop having a central opening formed therein and including an integral stake flexibly connected thereto.

* * * * *